UNITED STATES PATENT OFFICE.

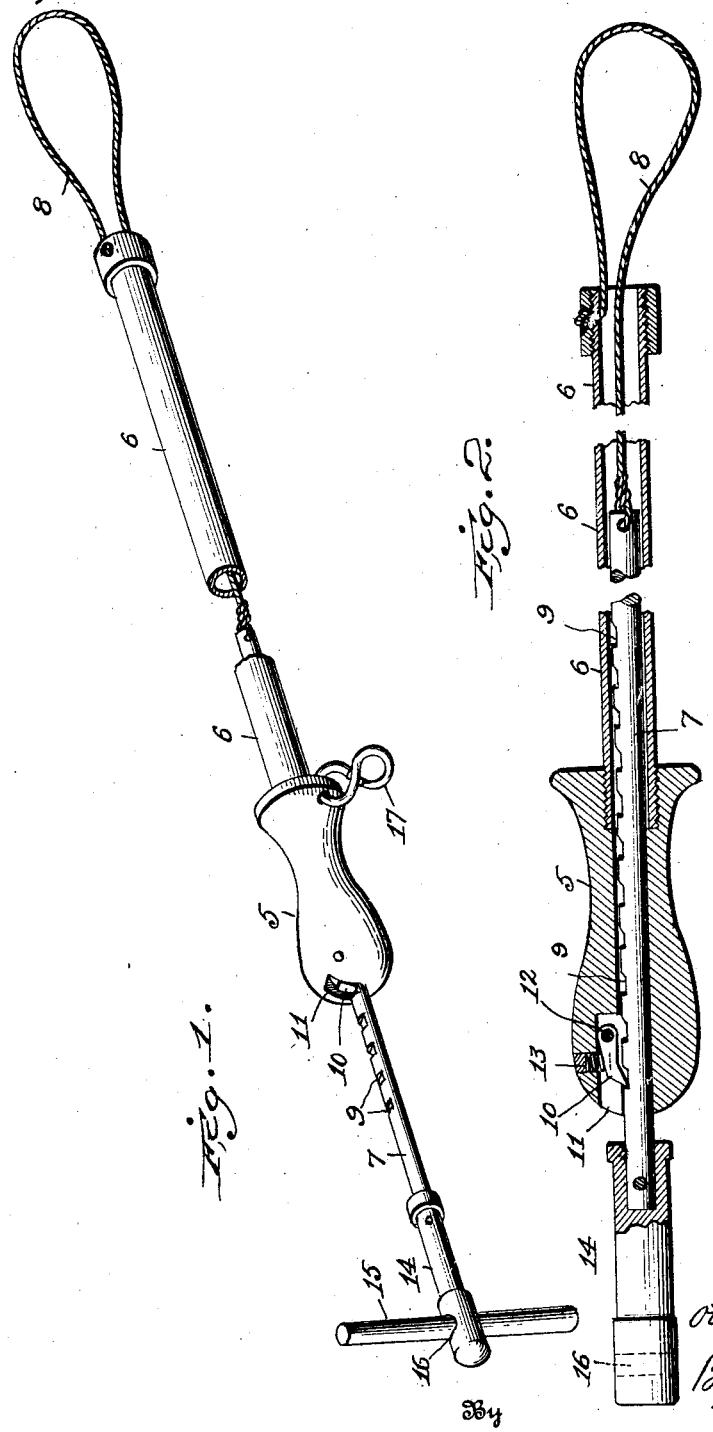

OTTO M. LUNDENE, OF FLINT, MICHIGAN.

HOG-CATCHER.

1,382,520.   Specification of Letters Patent.   Patented June 21, 1921.

Application filed January 31, 1921. Serial No. 441,116.

*To all whom it may concern:*

Be it known that I, OTTO M. LUNDENE, a citizen of the United States of America, and a resident of Flint, county of Genesee, and State of Michigan, have invented certain new and useful Improvements in Hog-Catchers, of which the following is a full and clear specification.

The object of this invention is to provide a simple, inexpensive and efficient device for holding hogs by the snout or jaws while being vaccinated or ringed, as more fully hereinafter set forth.

In the drawing—

Figure 1 is a view partly in perspective and partly in section; and

Fig. 2 is a view partly in longitudinal section and partly in side elevation of my device.

In the drawing, 5 designates a handle having a passage extending longitudinally through it and a long tube 6 screwed into one end of it. Sliding through the handle and tube is a rod 7 which at its forward end is connected to one end of a wire or cable 8 which is long enough to form a loop at the forward end of the tube and which has its other end attached to the forward end of the tube, so that by moving the rod forwardly in the tube the loop may be enlarged and, conversely, made smaller by sliding the tube forwardly.

The rod is provided with a multiplicity of notches 9 along one side, and adapted to engage in any one of these notches is a pawl 10 mounted in a recess 11 in the rear end of the handle, so as to be entirely housed by the handle. The pawl is pivoted at 12 and is normally pressed toward the rod by means of a spring 13, so that, when the rod is turned so as to bring its line of notches into line with the pawl, the pawl will engage one of the notches and thereby lock the rod against forward movement, so that when the loop 8 is placed over the mouth of the hog and the rod is pulled rearwardly, the pawl will automatically engage in the proper notch and thus hold the loop taut on the hog's mouth.

Attached to the rear end of the rod is another handle, consisting of a cylindrical bar 14 affixed to the rear end of the rod and a rod 15 detachably attached to the rounded bar 14 by being passed through a transverse hole 16 formed in the rear end of the bar 14, the rod 15 having a snug fit in the hole but being readily removed therefrom by the exertion of a little effort.

In applying the device to a hog, one hand grasps the main handle 5 and the other hand grasps the pulling handle 15—16, the pulling handle being obviously so constructed as to render the rod easily manipulated, it being necessary to not only rotate the rod but also to pull it rearwardly in applying the loop to the hog's mouth.

To anchor the device, I attach to the main handle 5 a pivotal link 17, which may be attached to an anchoring rope or chain which will hold the hog during the operation of ringing, etc. After the hog is thus anchored, the device may be allowed to fall upon the ground and remain there during the operation. Before this is done, however, the rod 15 is removed from the handle-bar 14, as shown in Fig. 2, so that the device may freely roll about on the ground without accidental rotation of the latching rod 7, thereby obviating accidental unlocking of the pawl. Should the turning and pulling rod 15 be allowed to remain on the handle-bar 14, it will be seen that if the device were allowed to roll about on the ground there would be almost certain disconnection of the latching devices. Another feature which insures against accidental unlatching is that the pawl is entirely housed in the handle, thereby preventing it being disconnected from the rod when the device is rolled or flopped about on the ground. With my apparatus, it will be observed therefore that a single man can perform such operations as ringing, vaccinating, etc.

The nature and scope of the invention having been thus indicated and its preferred embodiment having been specifically described, what is claimed as new is:

1. In a hog-holding device, a main handle having a passage through it and having a latching pawl entirely housed within it, a tube attached to one end of the handle, a rotatable notched rod passing through the handle and the tube and having a flexible member connecting its forward end to the end of the tube to thereby form a contractible loop, and another handle-member connected to the rear end of the notched rod.

2. In a hog-holding device, a main handle having a passage through it and having a latching pawl entirely housed within it, a tube attached to one end of the handle, a rotatable notched rod passing through the handle and the tube and having a flexible member connecting its forward end to the end of the tube to thereby form a contractible loop, and another handle-member connected to the rear end of the notched rod, said main handle being provided with an anchoring attachment.

3. In a hog-holding device, a main handle having a passage through it and having a latching pawl entirely housed within it, a tube attached to one end of the handle, a rotatable notched rod passing through the handle and the tube and having a flexible member connecting its forward end to the end of the tube to thereby form a contractible loop, and another handle-member connected to the rear end of the notched rod, said supplemental handle being provided with a detachable transverse handle-bar, for the purpose set forth.

4. In a hog-holding device, a main handle having a passage through it and carrying a spring-actuated pawl, a tube attached to one end of said handle, a rotatable notched rod slidable through the handle and the tube and connected to one end of the loop at its forward end, and another handle connected to the rear end of the rod and consisting of a cylindrical member attached to the rod and a transverse rod extending detachably through said member.

In testimony whereof I hereunto affix my signature.

OTTO M. LUNDENE.